United States Patent
Tyndall et al.

(10) Patent No.: US 7,500,047 B1
(45) Date of Patent: Mar. 3, 2009

(54) SYSTEM AND METHOD FOR PROCESSING COMMANDS

(75) Inventors: John F. Tyndall, Austin, TX (US); Linlin Gao, Cedar Park, TX (US)

(73) Assignee: Crossroads Systems, Inc., Austin, TX (US)

( * ) Notice: Subject to any disclaimer, the term of this patent is extended or adjusted under 35 U.S.C. 154(b) by 200 days.

(21) Appl. No.: 11/004,297

(22) Filed: Dec. 3, 2004

(51) Int. Cl.
*G06F 13/36* (2006.01)
(52) U.S. Cl. .................. 710/315; 710/105; 710/106; 710/311
(58) Field of Classification Search ......... 710/311–315, 710/5, 8, 19, 22, 33, 62, 106
See application file for complete search history.

(56) References Cited

U.S. PATENT DOCUMENTS

| | | | |
|---|---|---|---|
| 4,135,240 A * | 1/1979 | Ritchie | 711/164 |
| 4,514,808 A * | 4/1985 | Murayama et al. | 710/307 |
| 5,887,187 A * | 3/1999 | Rostoker et al. | 712/29 |
| 5,941,972 A * | 8/1999 | Hoese et al. | 710/315 |
| 6,073,201 A * | 6/2000 | Jolley et al. | 710/315 |
| 6,115,771 A * | 9/2000 | Born | 710/315 |
| 6,553,440 B1 * | 4/2003 | Ikegaya | 710/62 |
| 6,668,319 B1 * | 12/2003 | Newell et al. | 713/100 |
| 6,738,854 B2 * | 5/2004 | Hoese et al. | 710/315 |
| 6,789,154 B1 * | 9/2004 | Lee et al. | 710/315 |
| 6,810,445 B1 * | 10/2004 | Sato et al. | 710/33 |
| 6,842,264 B1 * | 1/2005 | Leyva et al. | 358/1.15 |
| 6,934,769 B2 * | 8/2005 | Smith | 710/5 |
| 6,948,025 B2 * | 9/2005 | Yoshida | 710/315 |
| 6,996,642 B2 * | 2/2006 | Apperley et al. | 710/74 |
| 7,069,350 B2 * | 6/2006 | Fujita et al. | 710/22 |
| 2005/0122991 A1 * | 6/2005 | Golasky et al. | 370/467 |

OTHER PUBLICATIONS

Lamers, Lawrence. Information Technology—Small Computer System Interface—2. Sep. 7, 1993. Revision 10L. http://www.micromagic.com/ftp/scsi2.pdf.*
Information Technology Industry Council. SCSI/ATA Translation (SAT). American National Standards Institute, Inc. 2006.*
Bailey et al. An Implementation of a GSN to Fibre Channel Bridge USing Scheduled Transfer Encapsulation of the SCSI Protocol. GENROCO, Inc. Nov. 6, 1998.*
Chadalapaka et al. A Study of iSCSI Extensions for RDMA (iSER). Proceedings of the ACM SIGCOMM 2003 Workshops. Aug. 2003.*

* cited by examiner

*Primary Examiner*—Khanh Dang
*Assistant Examiner*—Matthew D Spittle
(74) *Attorney, Agent, or Firm*—Sprinkle IP Law Group

(57) ABSTRACT

Embodiments of the present invention provide for conversion between command protocols. A routing device, or other device in the command path, can receive a command from an initiator, determine if the initiator and target for the command support the same command protocol and, if not, convert the command and/or response between the command protocols used by the initiator and the target. For commands not supported by the target or for particular predetermined commands, the device can generate a response to the command rather than passing the command to the target. Additionally, the device can modify responses from the target to include additional data and indications of errors according to the command protocol supported by the initiator.

33 Claims, 4 Drawing Sheets

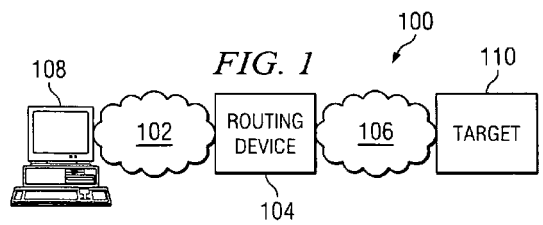

| BIT BYTE | 7 | 6 | 5 | 4 | 3 | 2 | 1 | 0 |
|---|---|---|---|---|---|---|---|---|
| 0 | PERIPHERAL QUALIFIER | | | PERIPHERAL DEVICE TYPE | | | | |
| 1 | RMB | 208 | 210 | DEVICE-TYPE MODIFIER | | | 212 | |
| 2 | ISO VERSION | | ECMA VERSION | | | ANSI-APPROVED VERSION | | |
| 3 | AENC | TRMIOP | RESERVED | | RESPONSE DATA FORMAT | | | |
| 4 | ADDITIONAL LENGTH (n-4) | | | | | | | |
| 5 | RESERVED | | | | | | | |
| 6 | RESERVED | | | | | | | |
| 7 | RELADR | WBUS32 | WBUS16 | SYNC | LINKED | RESERVED | CMDQUE | SFTRE |
| 8 –– 15 | (MSB) 204 VENDOR IDENTIFICATION (LSB) | | | | | | | |
| 16 –– 31 | (MSB) PRODUCT IDENTIFICATION (LSB) | | | | | | | |
| 32 –– 35 | (MSB) PRODUCT REVISION LEVEL (LSB) | | | | | | | |
| 36 –– 55 | VENDOR-SPECFIC | | | | | | | |
| 56 –– 95 | RESERVED | | | | | | | |
| | VENDOR-SPECIFIC PARAMETERS | | | | | | | |
| 96 –– n | VENDOR-SPECFIC | | | | | | | |

FIG. 2B

| BIT BYTE | 7 | 6 | 5 | 4 | 3 | 2 | 1 | 0 |
|---|---|---|---|---|---|---|---|---|
| 0 | PERIPHERAL QUALIFIER ||| | PERIPHERAL DEVICE TYPE ||||
| 1 | RMD | RESERVED ~214 |||||||
| 2 | 202 VERSION ||||||||
| 3 | AERO | OBSOLETE | NORMACA | HISUP | RESPONSE DATA FORMAT ||||
| 4 | ADDITIONAL LENGTH (n-4) ||||||||
| 5 | SCCS | 206 RESERVED 202 202 |||||||
| 6 | BQUE | ENCSERV | VS | MULTIP | MCHNGR | OBSOLETE | OBSOLETE | ADDR16† |
| 7 | RELADR | OBSOLETE | WBUS16† | SYNC† | LINKED | OBSOLETE | CMDQUE | VS |
| 8 | (MSB) 202 VENDOR IDENTIFICATION 202 ||||||||
| 15 | (LSB) ||||||||
| 16 | (MSB) PRODUCT IDENTIFICATION ||||||||
| 31 | (LSB) ||||||||
| 32 | (MSB) PRODUCT REVISION LEVEL ||||||||
| 35 | (LSB) ||||||||
| 36 | VENDOR SPECFIC ||||||||
| 55 |  ||||||||
| 56 | RESERVED |||| CLOCKING† || QAS† | IUS† |
| 57 | RESERVED ||||||||
| 58 | (MSB) VERSION DESCRIPTOR 1 ||||||||
| 59 | (LSB) ||||||||
|  | ⋮ ||||||||
| 72 | (MSB) VERSION DESCRIPTOR 8 ||||||||
| 73 | (LSB) ||||||||
| 74 | RESERVED ||||||||
| 95 |  ||||||||
|  | VENDOR SPECIFIC PARAMETERS ||||||||
| 96 | VENDOR SPECFIC ||||||||
| n |  ||||||||
| NOTE: †THE MEANINGS OF THESE FIELDS ARE SPECIFIC TO SPI-3 (SEE 7.3.3). FOR PROTOCOLS OTHER THAN THE SCSI PARALLEL INTERFACE, THESE FIELDS ARE RESERVED |||||||||

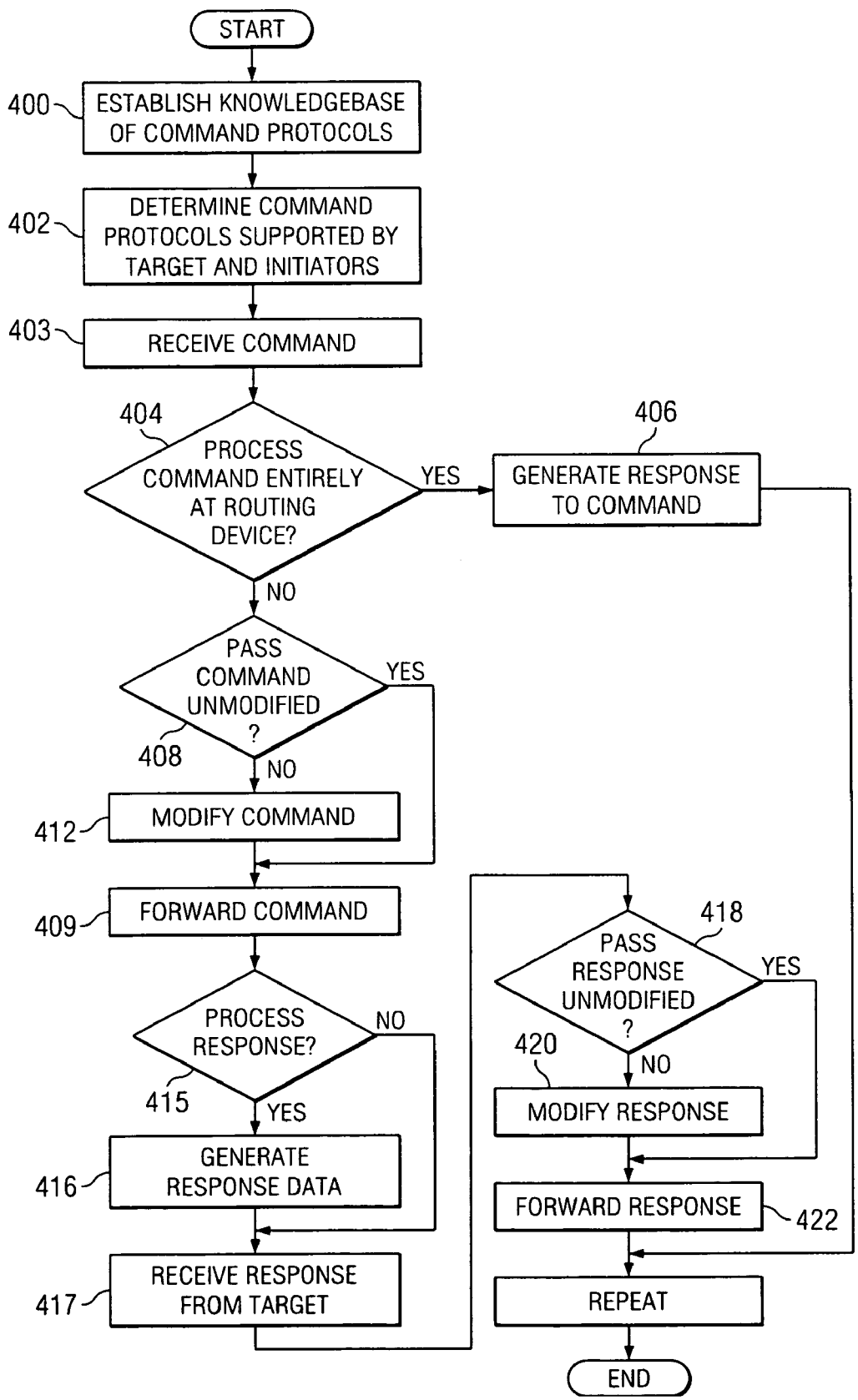

SYSTEM AND METHOD FOR PROCESSING COMMANDS

TECHNICAL FIELD OF THE INVENTION

Embodiments of the present invention relate to the field of command processing. More particularly, embodiments of the present invention relate to ensuring operations between devices supporting various command protocols.

BACKGROUND

The small computer system interface ("SCSI") protocol has become a ubiquitous protocol for formatting commands. Versions of the SCSI standard (e.g., SCSI-1, SCSI-2, SCSI-3) define both a command protocol with a set of defined commands ("SCSI commands") and responses, a data transport protocol (the "SCSI transport protocol") for encapsulating the commands and responses, and a SCSI physical interface. SCSI commands can be encapsulated according to a variety of data transport protocols without using the SCSI data transport protocol or SCSI physical interface. Example data transport protocols include fibre channel, serial storage architecture, serial bus protocol, iSCSI, advanced technology attachment ("ATA"), serial ATA ("SATA"), serial attached SCSI ("SAS") and others. Thus, the SCSI standard separates the SCSI physical interface, SCSI command sets and the SCSI data transport protocol.

As the SCSI standard has evolved, operability issues have arisen between devices that use different versions of the SCSI standard. For example, legacy devices that support the SCSI-1 or SCSI-2 standard may not support all the commands of the SCSI-3 standard. Additionally, various versions of SCSI primary commands ("SPC") have been developed, such that a device supporting SPC-2 commands may not support SCSI-2 formatted commands. As an example, in a fibre channel network, an initiator may send a LOGICAL UNIT RESET task managed function to a SCSI-1 or SCSI-2 compliant device. The LOGIC UNIT RESET message, however, was not made mandatory until the SPC-1 standard came out. If a drive that is not compliant with an SPC standard receives the LOGICAL UNIT RESET message, it will not understand how to process the message and may not reset the logical unit number ("LUN").

One solution to this problem is to replace the legacy devices. This solution can be unsatisfactory as it is expensive and requires the migration of data to new devices. Another solution is to limit the commands that can be issued by newer devices to those supported by older devices. This solution is also unsatisfactory as it limits the functions provided by the network as a whole to the functions supported by a particular set of typically older and less functional devices.

SUMMARY OF THE INVENTION

Embodiments of the present invention provide for command processing systems and methods that eliminate or reduce the shortcomings associated with prior art systems and methods of command processing. More particularly, embodiments of the present invention increase operability between command protocols.

One embodiment of the present invention comprises receiving a command destined for a target according to a first command protocol and determining if the target supports the first command protocol. In one embodiment, if the target supports the first command protocol, the method further comprises forwarding the command to the target. If the target does not support the first command protocol, the method can further comprise determining if the command requires modification according to the second command protocol. If the command requires modification, the command can be modified to convert the command from the first command protocol to the second command protocol based on a knowledgebase mapping the first command protocol to the second command protocol. The method can also comprise forwarding the command modified according to the second command protocol to the target.

Another embodiment of the present invention can include a method of processing responses to commands comprising, determining that an initiator supports a first command protocol and a target supports a second command protocol, receiving a response to a command from the target in accordance with the second command protocol, converting the response from the second command protocol to the first command protocol based on a knowledgebase mapping the first command protocol to the second command protocol and forwarding the response modified according to the first command protocol to the initiator.

Yet another embodiment of the present invention can include a computer program product comprising a set of computer instructions stored on a computer readable medium. The set of computer instructions comprise instructions executable to, determine that an initiator operates according to a first command protocol, determine if a target of a command received from the initiator supports the first command protocol, and if the target supports the first command protocol, forward the command to the target. On the other hand, if the target does not support the first command protocol, the computer instructions can comprise instructions executable to determine if the command requires conversion to a second command protocol supported by the target, and if the command requires conversion, convert the command to the second command protocol based on a knowledgebase mapping the first command protocol to the second command protocol and forward the command modified according to the second command protocol to the target.

Yet another embodiment of the present invention comprises a computer program product comprising a set of computer instructions stored on a computer readable medium. The set of computer instructions comprise instructions can be executable to determine that an initiator supports a first command protocol and a target supports a second command protocol, convert a response received from a target from the second command protocol to the first command protocol based on a knowledgebase mapping the first command protocol to the second command protocol and forward the response to the initiator.

Yet another embodiment of the present invention can include a routing device comprising, a first controller operable to interface with a first data transport medium, a second controller operable to interface with a second data transport medium, a buffer to provide a memory workspace for the routing device and a processing unit connected to the first controller, the second controller and the buffer. wherein the processing unit can be operable to determine that an initiator operates according to a first command protocol, determine if a target for a command received from the initiator supports the first command protocol and if the target supports the first command protocol, forward the command to the target. If the target does not support the first command protocol, the processing unit can be operable to determine if the command requires conversion to a second command protocol. If the command requires conversion, the processing unit can be operable to convert the command to the second command protocol based on a knowledgebase mapping the first command protocol to the second command protocol and forward the command modified according to the second command protocol to the target.

Another embodiment of the present invention can include a routing device comprising A routing device comprising a first controller operable to interface with a first data transport medium, a second controller operable to interface with a second data transport medium, a buffer to provide a memory workspace for the routing device and a processing unit connected to the first controller, the second controller and the buffer. The processing unit can be operable to determine that an initiator supports a first command protocol and a target supports a second command protocol, convert a response received from a target from the second command protocol to the first command protocol based on a knowledgebase mapping the first command protocol to the second command protocol and forward the response modified according to the first command protocol to an initiator.

Embodiments of the present invention provide an advantage over prior art systems and methods of command processing in data communications systems by allowing for interoperability between various command protocols.

Embodiments of the present invention provide another advantage over prior art systems and methods of command processing in data communications systems by obviating or reducing the need to replace network devices that support older command protocols.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein:

FIG. 1 is a diagrammatic representation of one embodiment of a data communication system according to the present invention;

FIGS. 2A and 2B are diagrammatic representation of response formats according to various command protocols;

FIG. 4 is a flow chart illustrating one embodiment of a method for processing commands and responses.

DETAILED DESCRIPTION

Figure 3A:
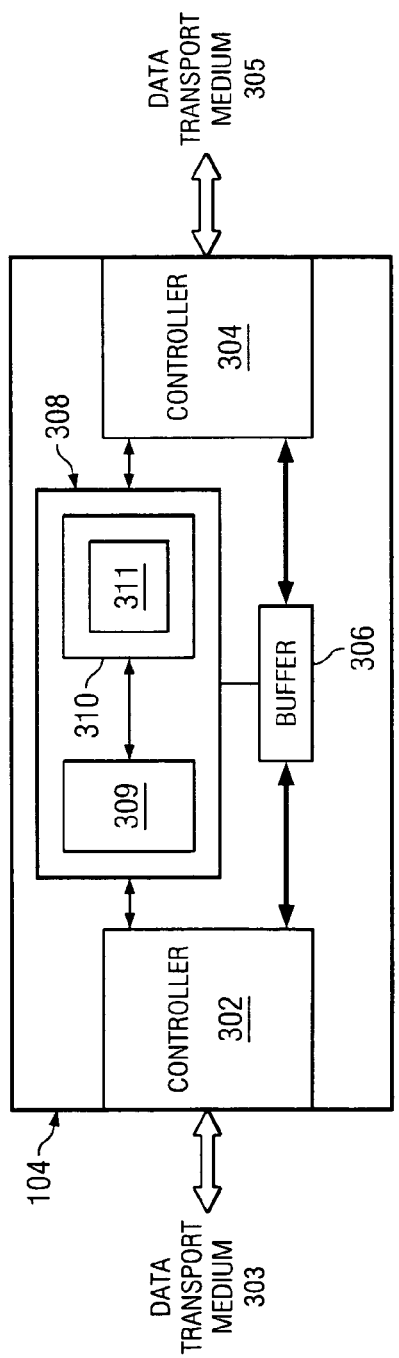
FIG. 3A is a diagrammatic representation of one embodiment of a routing device and FIG. 3B is a diagrammatic representation of one embodiment of a data flow in the example routing device of FIG. 3B.

Preferred embodiments of the invention are illustrated in the FIGURES, like numerals being used to refer to like and corresponding parts of the various drawings.

Embodiments of the present invention provide for conversion between command protocols for devices that send and/or receive commands in a network (e.g., hosts, storage routers, target storage devices in a storage area network). A routing device, or other device in the command path, can receive a command from an initiator, determine if the initiator and target for the command support the same command protocol and, if not, modify the command and/or response to convert between the command protocols used by the initiator and the target. For commands that are not supported for the target (i.e., can not be modified so that the target can understand the command), the device can process the command. Additionally, the device can modify responses from the target to include additional data and indications of errors according to the command protocol supported by the initiator.

For purposes of this application a "command protocol" is a protocol that defines one or more commands and/or responses including, but not limited to, SCSI-1, SCSI-2, SCSI-3, SPC-1, SPC-2, SPC-3, SCSI block command sets, RAID command protocols, SCSI controller command sets, fibre channel command protocols, proprietary command protocols and other command protocols known or developed in the art.

FIG. 1 is a diagrammatic representation of one embodiment of a data communication system 100 according to the present invention. Data communication system 100 can be a storage area network ("SAN") or network attached storage ("NAS") network. Communication system 100 can include a first data transport medium 102, an interface device 104, and a second data transport medium 106. An initiator 108 (e.g., any device that can initiate a command such as a host computer) connected to the first data transport medium 102 can send commands to and receive responses from a target 110 (e.g., any device that can receive and process a command such as a storage device, examples of which include hard disk drives, tapes, RAID systems) connected to the second data transport medium. First data transport medium 102 and second data transport medium 106 can operate according to any data transport protocol, including SCSI, Fibre Channel, advanced technology attachment ("ATA"), serial ATA ("SATA"), iSCSI, infiniband, parallel SCSI, serial attached SCSI or other data transport protocol known or developed in the art. By way of example, first data transport medium 102 can be a fibre channel transport medium and second data transport medium 106 can be a SCSI data transport medium, such as a SCSI bus. It should be noted that while only one initiator and one target are shown, data communications system 100 can include one or more initiators and one or more targets.

Continuing with the example in which data transport medium 102 is a fibre channel data transport medium and data transport medium 106 is a SCSI transport medium, routing device 104 can map the initiator/host device to the target(s) according to any address mapping scheme known in the art, including that described in U.S. Pat. No. 6,041,381, entitled "Fibre Channel to SCSI Addressing Method and System," issued Mar. 21, 2000 to Hoese, which is hereby fully incorporated by reference herein and provide access control between host and target devices, such as described in U.S. Pat. No. 5,941,972, entitled "Storage Router and Method for Providing Virtual Local Storage" by Hoese, et al., issued Aug. 24, 1999, U.S. Pat. No. 6,421,753, entitled "Storage Router and Method for Providing Virtual Local Storage" by Hoese, et al., issued Jul. 16, 2002, U.S. Pat. No. 6,425,035, entitled "Storage Router and Method for Providing Virtual Local Storage" by Hoese, et al., issued Jul. 23, 2002, U.S. Pat. No. 6,730,854, entitled "Storage Router and Method for Providing Virtual Local Storage" by Hoese, et al., issued May 18, 2004, U.S. Pat. No. 6,789,752, entitled "Storage Router and Method for Providing Virtual Local Storage" by Hoese, et al., issued Jul. 19, 2004, U.S. Pat. No. 6,763,419 entitled "Storage Router and Method for Providing Virtual Local Storage" by Hoese, et al., issued Sep. 7, 2004, U.S. patent application Ser. No. 10/658,163, filed Sep. 9, 2003, entitled "Storage Router and Method for Providing Virtual Local Storage" by Hoese, et al., each of which is hereby fully incorporated by reference herein.

Routing device 104 can include any network device known in the art, including storage routers, bridges, gateways or other device capable of routing data. Exemplary embodiments of routing devices include the Crossroads 6,000 and 10,000 Storage Routers by Crossroads Systems, Inc., of Austin Tex. Routing device 104 can comprise computer executable instructions to maintain a database, referred to as a knowledgebase 109, of command protocols used by devices (e.g., initiators and targets) that communicate data through routing device 104. For example, routing device 104 can maintain a knowledgebase 109 mapping a command protocol used by initiator 108 and a command protocol supported by target 110. In one embodiment, the knowledgebase 109 can include a knowledgebase 109 of the entire command protocol supported by each device or simply a mapping of incompatibilities between the command protocols. For incompatibilities, knowledgebase 109 can specify conversions between the command protocols for commands, task management functions and/or messages. By way of example, but not limitation, the knowledge base can include mappings between SCSI-1 and SCSI-2, SCSI-1 and SCSI-3, SCSI-2 and SCSI-3, SCSI-1 and SPC-1, SCSI-1 and SPC-2, SCSI-2 and SPC-1, SCSI-2 and SPC-2, SCSI-3 and SPC-1, SCSI-3 and SPC-2, and SPC-1 and SPC-2 commands/command protocols. Additional mappings can be implemented as new command protocols, such as SPC-3, are deployed.

As an example, if initiator 108 is an SPC-2 compliant device and target 110 is a SCSI-1, but not SPC-2 compliant device, routing device 104 can maintain a mapping between the SPC-2 and SCSI-1 command protocols. For example, assume initiator device 108 is a host computer operating according to the SPC-2 command protocol and target 110 is a hard disk drive operating according to the SCSI-1 command protocol that stores data for host device 108. If host computer 108 wants to reset the LUN for hard disk 110, it sends a LOGICAL UNIT RESET COMMAND, which is the command to accomplish this task according to SPC-2. If this command is received at routing device 104, in this example, the LUN cannot be reset because it is not the proper SCSI-1 command for target 110, which is, in this example, a SCSI-1 target. In the example, when routing device 104 receives the LOGICAL UNIT RESET task management function from initiator 108, routing device 104 can convert the LOGICAL UNIT RESET into a BUS DEVICE RESET based on the command mapping, where BUS DEVICE RESET is the command to accomplish resetting the LUN for SCSI-1 target 110. If, as another example, target device 110 is SCSI-2 but not SPC-2 compliant, routing device 104 can maintain a mapping of SPC-2 to SCSI-2 and can convert the LOGICAL UNIT RESET into a TARGET RESET based on the command mapping.

In some cases, the command mapping can specify that the routing device 104 should, for example, reformat a response or fill in data not provided by a target device. By way of example, the INQUIRY command is typically the first command issued to a target device during device discovery. The response from target 110 to the INQUIRY command contains information about the target device to which the command is directed including information about which level of the SCSI standard the target device supports. The response format for the SCSI-2 standard, however, is different than the response format for the SPC-2 standard. Embodiments of the present invention can maintain in the knowledgebase 109 a listing of information that can be added/modified when a response is returned to the requesting device.

Turning briefly to FIGS. 2A and 2B, FIG. 2A is a diagrammatic representation of a response format according to the SCSI-2 standard and FIG. 2B is a diagrammatic representation of a response format according to the newer SPC-2 standard. As can be seen from these FIGURES, the response formats between the SPC-2 and SCSI-2 command protocols vary. Several fields specified in the SCSI-2 standard are obsolete in the SPC-2 standard (as illustrated in FIG. 2B by obsolete fields 202 of FIG. 2B). For example, SPC-2 no longer specifies a "WBus32" field 204 (FIG. 2A). Additionally, as shown in FIG. 2B, the SPC-2 standard has added some fields that were not specified in the SCSI-2 standard, such as multiport field 206 (labeled "MultiP"). Additionally, other fields from the SCSI-2 response format have been merged or otherwise changed. For example, "ISO version" field 208, "ECMA version" field 210 and "ANSI-approved" field 212 of the SCSI-2 response format (FIG. 2A) have been merged into "version" field 214 of the SPC-2 response format (FIG. 2B).

Returning to FIG. 1, assume that initiator 108 sends an INQUIRY command according to the SPC-2 command protocol, but target 110 operates according to the SCSI-2 command protocol. Further assume that target 110 is a SCSI-2 tape device connected to routing device 104 by two ports. The SPC-2 compliant initiator 108 will typically send an INQUIRY command to determine, in part, whether there are multiple paths (e.g., ports) to a target. The SCSI-2 command protocol however does not provide any mechanism to indicate that multiple ports exist to communicate with the target.

Routing device 104 can receive the INQUIRY command, consult the knowledgebase 109 to determine that initiator 108 uses the SPC-2 command protocol and that target 110 uses the SCSI-2 command protocol. According to other embodiments of the present invention, routing device 104 can determine that initiator 108 and target 110 use different command protocols in other manners. For example, if a command is unique to a command protocol or includes information designating the command protocol, routing device 104 can determine the command protocol supported by initiator 108 from the command and determine the command protocol supported by target 110 from a lookup table of devices and command protocols. In another embodiment of the present invention, routing device 104 can forward a command to a target 110. If an error occurs, routing device 104 can then determine whether initiator 108 and target 110 support the same command protocol from, for example, a lookup table.

Continuing with the previous example, because the INQUIRY command is one of the commands that remains the same between the command protocols, routing device 104 can pass the command unchanged to target 110. In this case, while the command itself may be unchanged, the encapsulation data transport protocol for the command (e.g., fibre channel, SCSI data transport protocol, SATA, ATA or other data transport protocol) can change, as would be the case in which routing device 104 is a fibre channel-to-SCSI router. In response to the command, target 110 can send an INQUIRY response. Routing device 104 can receive the INQUIRY response and modify the INQUIRY response in accordance with SPC-2 command protocol to add data supported by the SPC-2, but not SCSI-2 protocol, eliminate obsolete fields or otherwise modify the response in accordance with SPC-2 protocol. Routing device 104 can, for example, change the version field to SPC-2 and set the MultiP bit. Routing device 104 can further eliminate obsolete data from the response and supply data for capabilities supported by SPC-2 but not SCSI-2 (e.g., can fill in a "MultiP" bit). Routing device 104 can also supply error indications for capabilities supported by SPC-2 but not SCSI-2.

As another example, assume initiator 108 is a fibre channel initiator that sends a MODE SENSE command to target 110 requesting all mode sense pages. A fibre channel initiator will typically expect to receive a Fibre Channel Logical Unit Control Mode Page and a Fibre Channel Port Control Mode Page in response to such a command. If target 110 is not a fibre channel target, however, target 110 will not provide these pages. Routing device 104 can receive the MODE SENSE command, forward the MODE SENSE command to target 110 and receive the response from target 110. In this example, some of the MODE SENSE pages returned by target 110 may not be relevant to a fibre channel initiator. Routing device 104 can, therefore, remove pages (or other mode sense data) not relevant to fibre channel initiator 108 prior to providing the response to initiator 108.

Moreover, since, the fibre channel characteristics of a non-fibre channel target are typically virtualized by a routing device, routing device 104, in this example, can provide the Fibre Channel Logical Unit Control Mode Page and the Fibre Channel Port Control Mode Page to initiator 108. In another embodiment, if initiator 108 only requests the fibre channel MODE SENSE pages in the first place, routing device 104 could, upon receiving the MODE SENSE command, simply return these MODE SENSE pages to initiator 108 without forwarding the MODE SENSE command to target 110.

Another example of a command that can be handled entirely by routing device 104 for target 108 is a REPORT LUNS command. The REPORT LUNS command is sent by a fibre channel initiator device to determine a list of valid logical units for a target or set of targets. In the case in which routing device 104 is a fibre channel-to-SCSI router (or fibre channel-to-non fibre channel router), and the targets are virtualized to, for example, appear to initiator 108 as local storage in a communication network where the targets are actually physically remote from initiator 108, routing device 104 can provide virtual LUNS that represent targets, such as target 110, to the initiator. Therefore, routing device 104 can present a list of LUNS to initiator 108 in response to the REPORT LUNS command without forwarding the command to target (s). As the LUN list returned by routing device 104 may list virtual LUNS, the LUNS listed may have no correlation to the actual address of targets and the LUNS listed in response to the REPORT LUNS command may change based on the initiator requesting the LUNS.

Routing device 104 can thus receive a command that was generated according to a first command protocol destined for a target from an initiator and determine if the target supports the first command protocol. If the target does not support the first command protocol, the routing device can determine if the command should be converted to the second command protocol. If the command should be converted, the routing device can convert the command to the second command protocol and forward the command to the target. If the command is not converted, the routing device can process the command itself without passing the command to the target or pass the command unconverted to the target.

FIG. 3A is a diagrammatic representation of one embodiment of a routing device 104 in which command processing according embodiments of the present invention can be implemented. Routing can comprise a first transport medium controller 302 that interfaces with a first transport medium 303 and a second transport medium controller 304 that interfaces with a second transport medium 305. In one embodiment of the present invention, the first transport medium 303 can be a Fibre Channel transport medium, the second transport medium 305 a SCSI bus, controller 302 a Fibre Channel controller, such as a fibre channel controller based on the TACHYON family of fibre channel control chips and controller 304 a SCSI controller. TACHYON fibre channel control chips are a product Agilent Technologies, Inc. of Palo Alto, Calif. Various forms of the Tachyon fibre channel control chip can be used including, but not limited to, the TL or Tachlite (HPFC-5100), the XL2 (HPFC-5200x, where x is the Rev A, B, C, etc.), the DX2 (HPFC-5400x, where x is the Rev A, B, C, etc.), the DX4 (HPFC-5700x, where x is the Rev A, B, C, etc.).

In other embodiments of the present invention the first and second transport media (and respective controllers) can be: Fibre Channel and Fibre Channel; SCSI and SCSI; iSCSI and iSCSI; Fibre Channel and iSCSI; iSCSI and Fibre Channel; iSCSI and SCSI; SCSI and iSCSI; Fibre Channel and Infiniband; Infiniband and Fibre Channel; iSCSI and ATA; ATA and iSCSI; iSCSI and SATA; Serial ATA and iSCSI; Fibre Channel and Serial Attached SCSI; Serial Attached SCSI and Fibre Channel; iSCSI and Serial Attached SCSI; Serial Attached SCSI and iSCSI; Fibre Channel and ATA; ATA and Fibre Channel; Fibre Channel and SATA; Fibre Channel and Fibre Advanced Technology Attachment ("FATA"); SATA and Fibre Channel; Fibre Channel and Serial SCSI Architecture; Serial SCSI Architecture and Fibre Channel; Infiniband and Serial Attached SCSI; Serial Attached SCSI and Infiniband. Moreover, the transport media can operate according to other protocols. Additionally, the various transport media can carry commands according to a variety of command protocols including, but not limited to, SCSI-1, SCSI-2, SCSI-3, SPC-1 and SPC-2.

A buffer 306 provides memory work space and is connected to both controller 302 and to controller 304. Buffer 306 can be located remotely from routing device 104 and can also comprise multiple buffers. A processing unit 308 can be connected to controller 302, controller 304 and buffer 306. According to one embodiment of the present invention, processing unit 308 comprises one or more processors 309 for controlling operation of routing device 104, handling address mapping and security access and converting commands between protocols and a computer readable medium 310 accessible by the processor storing a set of computer instructions 311 that are executable by the processor. According to other embodiments of the present invention buffer 306 and/or computer readable medium 311 can be onboard processor 310.

In one implementation (not shown), the storage router routing device 104 can be a rack mount or free standing device with an internal power supply. The routing device can have a Fibre Channel and SCSI port, and a standard, detachable power cord can be used, the FC connector can be an optical Small Form Factor ("SFF") connector, and the SCSI connector can be a VHDCI type. Additional modular jacks can be provided for a serial port and an 802.3 10BaseT port, i.e. twisted pair Ethernet, for management access. The SCSI port of the storage router 104 can support SCSI direct and sequential access target devices and can support SCSI initiators, as well. The Fibre Channel port can interface to SCSI-3 FCP enabled devices and initiators or other Fibre Channel devices.

To accomplish its functionality, one implementation of the routing device uses: a Fibre Channel interface based on the Agilent XL2 2 Gb/s Fibre Channel controller and an optical SFF transceiver; a PMCS RM7000A processor, incorporating independent data and program memory spaces, and associated logic required to implement a stand alone processing system; and a serial port for debug and system configuration. Further, this implementation includes a SCSI interface supporting Ultra-2 based on the SYMBIOS 53C8xx series SCSI controllers, and an operating system based upon the WIND RIVERS SYSTEMS VXWORKS kernel. In addition, the routing device can include software as required to control functions of the various elements, convert commands and responses between command protocols and generate commands and provide appropriate translations between the FC and SCSI data transport protocols (and for other protocol if necessary for other embodiments).

Figure 3B:
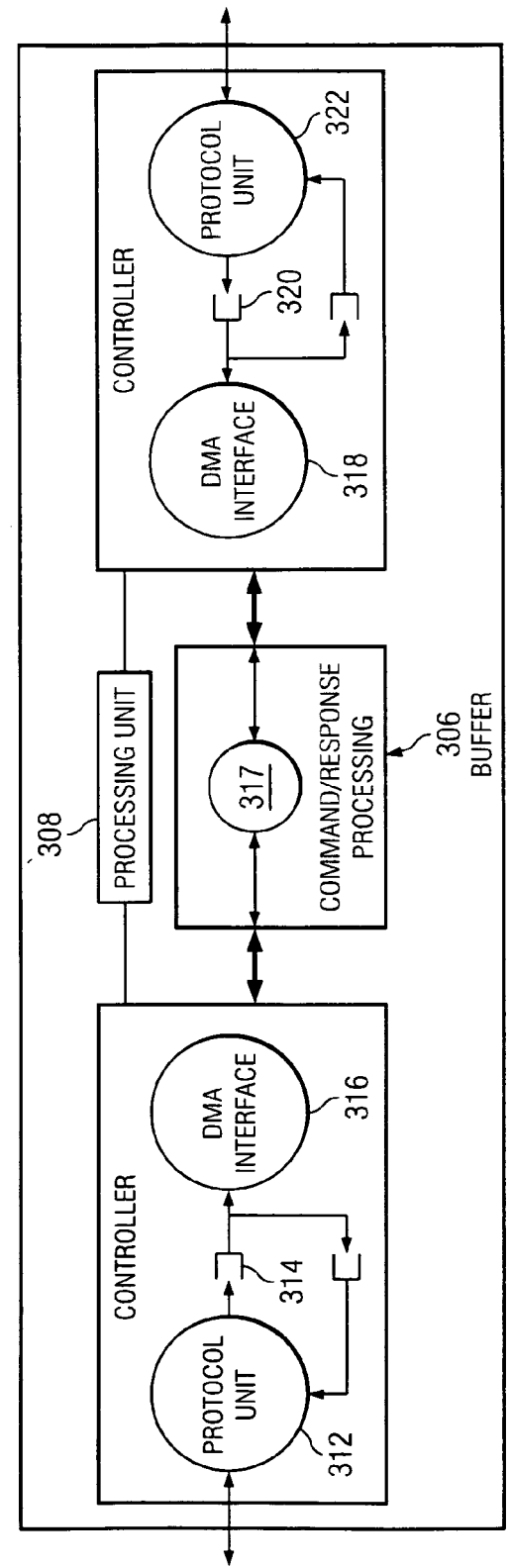

FIG. 3B is a block diagram of one embodiment of data flow within the storage router 104 of FIG. 3A. As shown, data from first transport medium 303 (e.g., the Fibre Channel transport medium) is processed by a protocol unit 312 (e.g., a Fibre Channel protocol unit) and placed in a FIFO queue 314. A direct memory access (DMA) interface 316 can then take data out of FIFO queue 314 and places it in buffer 306.

Processing unit 308 processes the data in buffer 306 as represented by supervisor processing 317. This processing can include mapping between the first data transport protocol and the second data transport protocol, mapping between command protocols and applying access controls and routing functions. A DMA interface 318 then pulls data from buffer 306 and places it into a buffer 320. A second protocol unit 322 pulls data from buffer 320 and communicates the data on the second transport medium 305 (e.g., the SCSI bus). Data flow in the reverse direction, from the second data transport medium 305 to the first data transport medium 303, can be accomplished in a reverse manner.

In one embodiment, processing unit 308 can be operable to maintain a knowledgebase of incompatibilities between command protocols. The knowledge base can be stored as a database, lookup table or any other suitable programming format. Based on the knowledgebase, processing unit 310 can determine if the command protocol used by an initiator is supported by a target and how to handle incompatibilities between the command protocols.

It should be noted that the example of the routing device of FIGS. 3A and 3B is provided by way of example. Embodiments of the present invention can be implemented in routing devices such as routers, bridges, hubs or other routing devices. Additionally, embodiments of the present invention can be implemented has hardware and/or software programming. Embodiments can be implemented as computer instructions stored on any computer readable medium known in the art (e.g., optical disk, magnetic disk, flash memory, RAM, ROM, EEPROM or other computer readable medium).

FIG. 4 is a flow chart illustrating one embodiment of a method for processing commands in a data communications network. At step 400, a knowledgebase of command protocols can be established for routing device 104. The knowledgebase can be stored at routing device 104, can be remotely accessible by routing device 104 or made accessible to routing device 104 in other manners. The knowledgebase can include incompatibilities between command protocols and provide any information necessary for a routing device to map between command protocols. The knowledgebase may simply include incompatibilities between protocols or may include the entire command protocols.

As shown in FIG. 4, routing device 104, at step 402, can establish the command protocols supported by devices with which it communicates (e.g., initiators and targets). This can be done, for example, by sending an INQUIRY command to each device during a discovery phase. In response to the INQUIRY command, each device discovered will typically return the command protocol that that device supports. For example, a device, such as a tape library, may return that it supports the SCSI-2 command protocol, whereas a fibre channel initiator may return that it supports the SPC-2 command protocol. Routing device 104 can associate each device with which it communicates with a command protocol and, for example, save this information in a database or other storage format. Alternatively, this information can be programmed in routing device 104.

At step 403, routing device 108 can receive a command from initiator 108 and, at step 404, determine if routing device 104 should process the command by default without forwarding the command to target 110. For example, if routing device 104 virtualizes LUNS for targets 110, the routing device can generate responses to all REPORT LUNS commands received even if the target devices 110 support the command (e.g., routing device 104 can respond to the REPORT LUNS command for fibre channel targets). As another example, routing device 104 can generate a response to a MODE SENSE command requesting only fibre channel pages from a SCSI-2 target attached to the routing device by a SCSI bus. If routing device 104 should handle the command, routing device 104 can generate the appropriate response to the command (step 406). If, on the other hand, routing device 104 determines that it should not handle the command by default, routing device 104 can consult the knowledgebase to determine if the command can be passed to target 110 without modification (step 408). If the command can be passed to target 110 without modification, as in the INQUIRY command example above, routing device 104 can forward the command to the target 110 at step 409.

If the command requires modification to account for differences between the command protocols, routing device can modify the command (step 412) and forward the modified command to target 110 (step 409). Modification of the command can include converting the command from a first command protocol used by the initiator to a second command protocol used by target 110 (e.g., changing a RESET LUNS command to a BUS DEVICE RESET command). Forwarding of the command can include converting the command between the data transport protocol used by the initiator to the data transport protocol used by target 110. Routing device 104, for example, can re-encapsulate a command (modified or unmodified) received over a fibre channel transport medium for transmission over a SCSI bus or other data transport medium.

At step 415 routing device 104 can determine whether it should process the command along with target 110. For example, if routing device 104 receives a MODE SENSE command requesting all mode sense pages from fibre channel initiator 108 directed to a SCSI-2 target 110 connected by a SCSI bus, routing device 104 can process the command to generate the Fibre Channel Logical Unit Control Mode Page and a Fibre Channel Port Control Mode Page. Routing device 104 can thus generate response data to be included in the response to initiator 108 (step 416).

At step 417, routing device 104 can receive a response from target 110. Routing device 104, at step 418, can determine if the response should be modified in accordance with the command protocol used by initiator 108. If the response should be modified, routing device 104 can modify the response (step 420) and forward the response to initiator 108 (step 422). Modification of the response can include adding data to the response (e.g., setting a MultiP bit in an INQUIRY response, adding fibre channel mode pages or adding other response data), adding errors to the response or other modifications. Forwarding of the response can include converting the response from one data transport protocol to another data transport protocol. If the response does not require modification, routing device 104 can forward the response to initiator 108 (step 422). The method of FIG. 4 can be arbitrarily repeated as needed or desired.

Embodiments of the present invention provide for conversion between command protocols. A routing device, or other device in the command path, can receive a command from an initiator, determine if the initiator and target for the command support the same command protocol and, if not, convert the command and/or response between the command protocol used by the initiator and target 110. For commands not supported by target 110 or for particular predetermined commands, the device can generate a response to the command rather than passing the command to target 110. Additionally, the device can modify responses from target 110 to include additional data and indicators of errors according to the command protocol supported by the initiator. While embodiments of the present invention were discussed primarily in terms of a single initiator sending commands to a single target, it should be understood that routing device 104 can be connected to (i.e., can communicate with) any number of targets and initiators and the knowledgebase for a routing device can map any number of command protocols.

Although the present invention has been described in detail herein with reference to the illustrated embodiments, it should be understood that the description is by way of example only and is not to be construed in a limiting sense. It is to be further understood, therefore, that numerous changes in the details of the embodiment of this invention and additional embodiments of this invention will be apparent, and may be made by, persons of ordinary skill in the art having reference to this description. It is contemplated that all such changes and additional embodiments are within scope of the invention as claimed below.

What is claimed is:

1. A method for processing commands comprising:
   maintaining a knowledgebase of command protocols at a routing device;
   receiving a command destined for a target from an initiator over a first data transport medium which implements a first data transport protocol, wherein the target is a SCSI based device;
   determining command protocols supported by the initiator and the target;
   modifying the command from a first command protocol supported by the initiator to a second command protocol supported by the target based on the knowledgebase of command protocols maintained at the routing device, wherein the first command protocol supported by the initiator is in a first version of the SCSI standard, wherein the second command protocol supported by the target is in a second version of the SCSI standard, and wherein the routing device comprises a processing unit for mapping the first data transport protocol to a second data transport protocol;
   forwarding the modified command which is in the second command protocol to the target over a second data transport medium which implements the second data transport protocol;
   receiving a response from the target over the second data transport medium; and
   modifying the response from the second command protocol in the second version of the SCSI standard supported by the target to the first command protocol in the first version of the SCSI standard supported by the initiator based on the knowledgebase of command protocols maintained at the routing device wherein modifying the response includes adding data to the response, deleting data from the response, or changing a field in the response.

2. The method of claim 1, further comprising forwarding the command unmodified to the target if the target supports the first command protocol.

3. The method of claim 2, wherein the command is identical for the first and second command protocols.

4. The method of claim 1, further comprising:
   forwarding the response modified according to the first command protocol to the initiator.

5. The method of claim 1, further comprising returning a response in accordance with the first command protocol to the initiator that comprises data generated at the routing device in response to the command and data generated by the target in response to the command.

6. The method of claim 1, further comprising:
   generating a response to the command at the routing device.

7. The method of claim 1, wherein the knowledgebase includes incompatibilities between command protocols.

8. A method of processing responses to commands comprising:
   maintaining a knowledgebase of command protocols at a routing device;
   determining that an initiator supports a first command protocol and a target supports a second command protocol, wherein the target is a SCSI based device, wherein the first command protocol supported by the initiator is in a first version of the SCSI standard, wherein the second command protocol supported by the target is in a second version of the SCSI standard;
   receiving a command destined for the target from the initiator over a first data transport medium which implements a first data transport protocol;
   mapping the first data transport protocol to a second data transport protocol at the routing device;
   forwarding the command to the target over a second data transport medium which implements the second data transport protocol, wherein the command is in the first command protocol;
   receiving a response to the command from the target in accordance with the second command protocol over the second data transport medium;
   mapping the second data transport protocol to the first data transport protocol at the routing device;
   modifying the response from the second command protocol in the second version of the SCSI standard to the first command protocol in the first version of the SCSI standard based on the knowledgebase of command protocols maintained at the routing device wherein modifying the response includes adding data to the response, deleting data from the response, or changing a field in the response; and
   forwarding the modified response to the initiator over the first data transport medium.

9. The method of claim 8, wherein the added data comprises data generated by the routing device in response to the command.

10. The method of claim 8, wherein modifying the response further comprises adding an indication of an error to the response.

11. The method of claim 8, wherein the knowledgebase includes incompatibilities between command protocols.

12. A computer program product comprising a set of computer instructions stored on a computer readable medium, wherein the set of computer instructions comprise instructions executable to:
   maintain a knowledgebase of command protocols at a routing device;
   determine that an initiator operates according to a first command protocol, wherein the first command protocol supported by the initiator is in a first version of the SCSI standard;

determine that a target operates according to a second command protocol, wherein the target is a SCSI based device and wherein the second command protocol supported by the target is in a second version of the SCSI standard;

receive a command destined for the target from the initiator over a first data transport medium which implements a first data transport protocol;

determine that the command requires conversion to a second command protocol;

convert the command to the second command protocol based on the knowledgebase of command protocols maintained at the routing device, wherein the routing device comprises a processing unit for mapping the first data transport protocol to a second data transport protocol;

forward the converted command which is in the second command protocol to the target over a second data transport medium which implements the second data transport protocol; and modify a response to the command according to the first command protocol, wherein modifying the response includes adding data to the response, deleting data from the response, or changing a field in the response.

13. The computer program product of claim 12, wherein the set of computer instructions further comprise instructions executable to forward the command unmodified to the target if the target supports the first command protocol.

14. The computer program product of claim 13, wherein the set of computer instructions further comprise instructions executable to:

forward the response modified according to the first command protocol to the initiator.

15. The computer program product of claim 13, wherein the set of computer instructions further comprise instructions executable to:

return the response in accordance with the first command protocol to the initiator, wherein the response comprises data generated at the routing device in response to the command and data generated by the target in response to the command.

16. The computer program product of claim 12, wherein the command is identical for the first and second command protocols.

17. The method of claim 12, wherein the knowledgebase includes incompatibilities between command protocols.

18. A computer program product comprising a set of computer instructions stored on a computer readable medium, wherein the set of computer instructions comprise instructions executable to:

maintain a knowledgebase of command protocols at a routing device;

determine that an initiator supports a first command protocol and a target supports a second command protocol, wherein the target is a SCSI based device, wherein the first command protocol supported by the initiator is in a first version of the SCSI standard and wherein the second command protocol supported by the target is in a second version of the SCSI standard;

receive a command destined for the target from the initiator over a first data transport medium which implements a first data transport protocol;

map the first data transport protocol to a second data transport protocol at the routing device;

forward the command to the target over a second data transport medium which implements the second data transport protocol, wherein the command is in the first second command protocol;

receive a response to the command from the target in accordance with the second command protocol over the second data transport medium;

map the second data transport protocol to the first data transport protocol at the routing device;

modify the response from the second command protocol in the second version of the SCSI standard supported by the target to the first command protocol in the first version of the SCSI standard supported by the initiator based on the knowledgebase of command protocols maintained at the routing device, wherein modifying the response includes adding data to the response, deleting data from the response, or changing a field in the response; and forward the modified response to the initiator over the first data transport medium.

19. The computer program product of claim 18 wherein the added data comprises data generated by the routing device in response to the command.

20. The computer program product of claim 18, wherein modifying the response further comprises adding an indication of an error to the response.

21. The method of claim 18, wherein the knowledgebase includes incompatibilities between command protocols.

22. A routing device comprising:

a first controller comprising a first direct memory access (DMA) interface for interfacing with a first data transport medium;

a second controller comprising a second DMA interface for interfacing with a second data transport medium;

a buffer connected to the first controller and the second controller, wherein the first DMA interface is to place commands received over the first data transport medium in the buffer and wherein the second DMA interface is to place responses received over the second data transport medium in the buffer;

a processing unit connected to the first controller, the second controller and the buffer, wherein the processing unit operates to:

determine that an initiator operates according to a first command protocol in a first version of the SCSI standard;

determine that a target supports a second command protocol in a second version of the SCSI standard, wherein the target is a SCSI based device;

convert a command received at the first controller from the initiator to the second command protocol based on a knowledgebase of command protocols;

forward the converted command to the second controller via the second DMA interface, wherein the second controller forwards the command to the target over the second data transport medium; and modify a response to the converted command from the second command protocol in the second version of the SCSI standard to the first command protocol in the first version of the SCSI standard, wherein modifying the response includes adding data to the response, deleting data from the response, or changing a field in the response.

23. The routing device of claim 22, wherein the processing unit is further operable to forward the command unmodified to the target if the target supports the first command protocol.

24. The routing device of claim 22, wherein the command is identical for the first and second command protocols.

25. The routing device of claim 22, wherein the processing unit further operates to generate data in response to the command and to modify the response to include the generated data.

26. The method of claim 22, wherein the knowledgebase includes incompatibilities between command protocols.

27. A routing device comprising:
a first controller comprising a first direct memory access (DMA) interface for interfacing with a first data transport medium;
a second controller comprising a second DMA interface for interfacing with a second data transport medium;
a buffer connected to the first controller and the second controller to provide a memory workspace for the routing device, wherein the first DMA interface is to place commands received over the first data transport medium in the buffer and wherein the second DMA interface is to place responses received over the second data transport medium in the buffer;
a processing unit connected to the first controller, the second controller and the buffer, wherein the processing unit is operates to:
determine that an initiator supports a first command protocol and a target supports a second command protocol, wherein the first command protocol supported by the initiator is in a first version of the SCSI standard, wherein the second command protocol supported by the target is in a second version of the SCSI standard, and wherein the target is a SCSI based device;
receive a command from the initiator over the first data transport medium at the first controller;
forward the command to the target over the second data transport medium, wherein the command is in the first command protocol;
modify a response received at the second controller from the target from the second command protocol in the second version of the SCSI standard supported by the target to the first command protocol in the first version of the SCSI standard supported by the initiator based on a knowledgebase of command protocols maintained at the routing device, wherein modifying the response includes adding data to the response, deleting data from the response, or changing a field in the response; and
forward the modified response to the initiator over the first data transport medium.

28. The routing device of claim 27, wherein the added data comprises data generated by the routing device in response to the command.

29. The routing device of claim 27, wherein modifying the response further comprises adding an indication of an error to the response.

30. The method of claim 27, wherein the knowledgebase includes incompatibilities between command protocols.

31. A method for processing commands comprising:
maintaining a knowledgebase of command protocols at a routing device;
establishing that an initiator operates according to a first command protocol and a target operates according to a second command protocol, wherein the target is a SCSI based device;
receiving a command destined for the target from the initiator over a first data transport medium which implements a first data transport protocol;
modifying the command from the first command protocol supported by the initiator to the second command protocol supported by the target based on the knowledgebase of command protocols maintained at the routing device, wherein the first command protocol supported by the initiator is in a first version of the SCSI standard, wherein the second command protocol supported by the target is in a second version of the SCSI standard, and wherein the routing device comprises a processing unit for mapping the first data transport protocol to a second data transport protocol;
forwarding the modified command which is in the second command protocol to the target over a second data transport medium which implements the second data transport protocol;
receiving a response from the target over the second data transport medium;
modifying the response from the second command protocol in the second version of the SCSI standard supported by the target to the first command protocol in the first version of the SCSI standard supported by the initiator based on the knowledgebase of command protocols maintained at the routing device, wherein modifying the response includes adding data to the response, deleting data from the response, or changing a field in the response; and
forwarding the modified response which is in the first command protocol to the initiator over the first data transport medium.

32. The method of claim 31, wherein the modified response further comprises data generated at the routing device in response to the command and data generated by the target in response to the command.

33. The method of claim 31, wherein the knowledgebase includes incompatibilities between command protocols.

* * * * *